Figure 15:
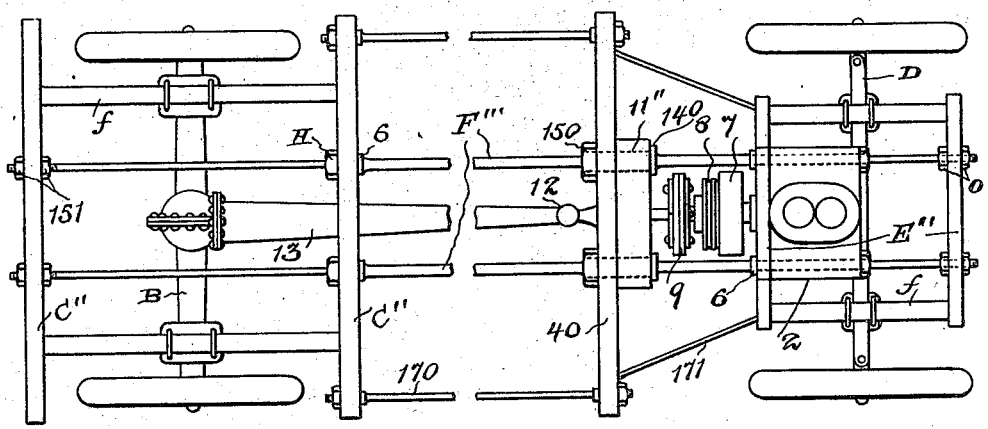

G. T. D. LENFESTEY.
DEMOUNTABLE MOTOR VEHICLE FRAME.
APPLICATION FILED JUNE 22, 1917.
1,313,429.
Patented Aug. 19, 1919.
3 SHEETS—SHEET 1.
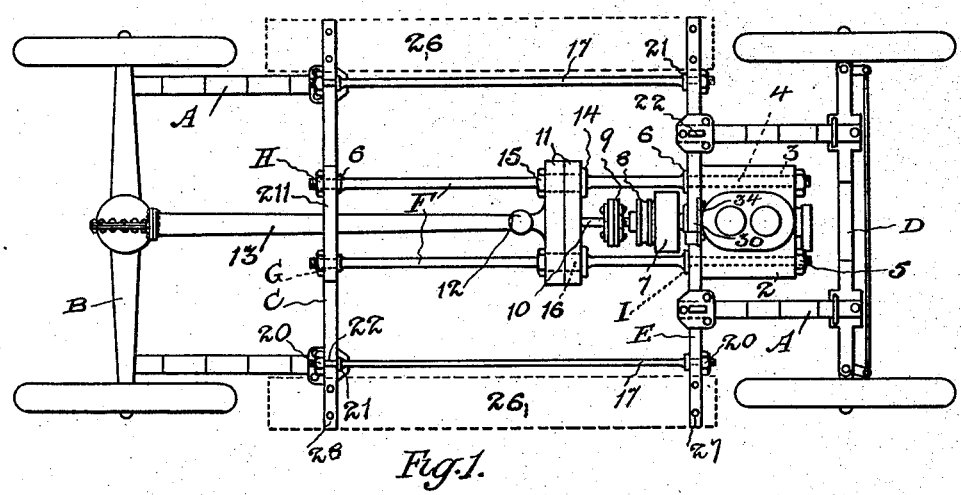
Fig. 1.
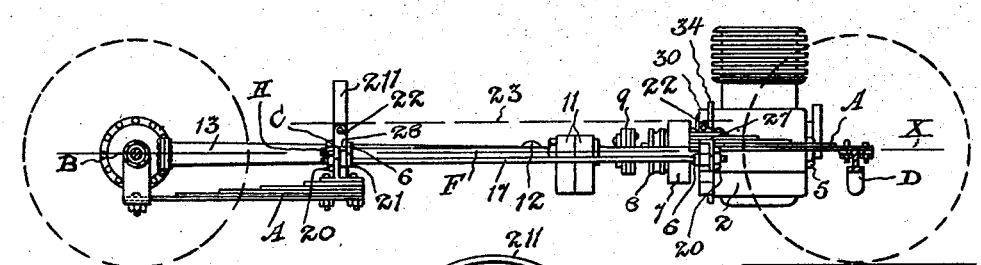
Fig. 2.
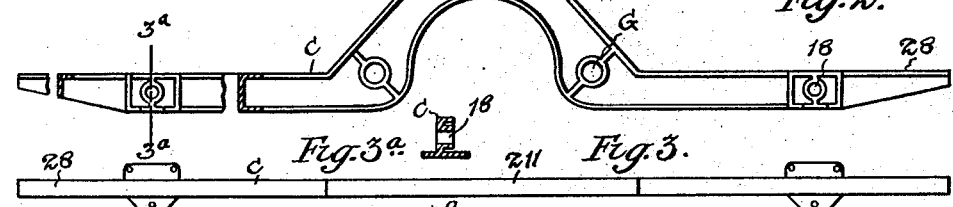
Fig. 3ᵃ. Fig. 3.
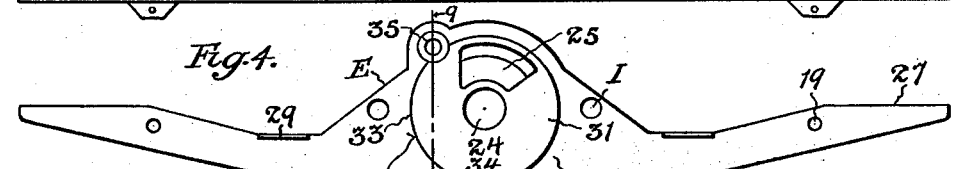
Fig. 4.
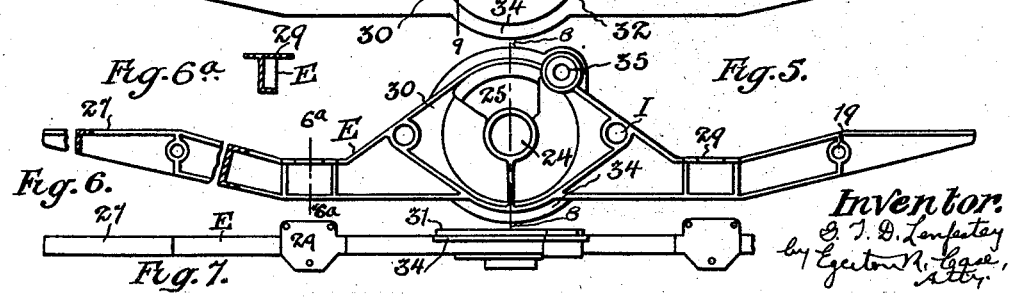
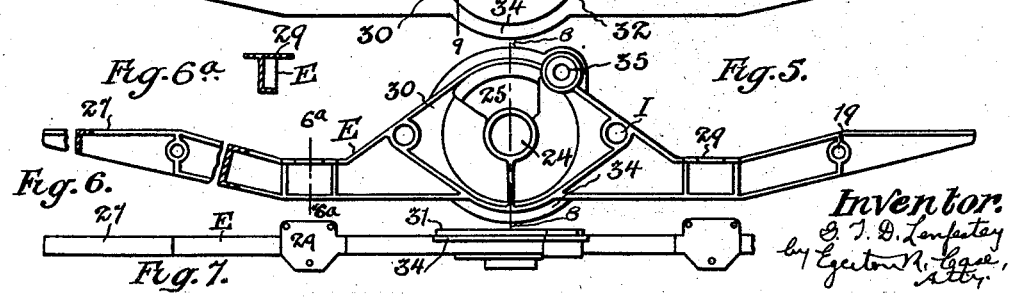
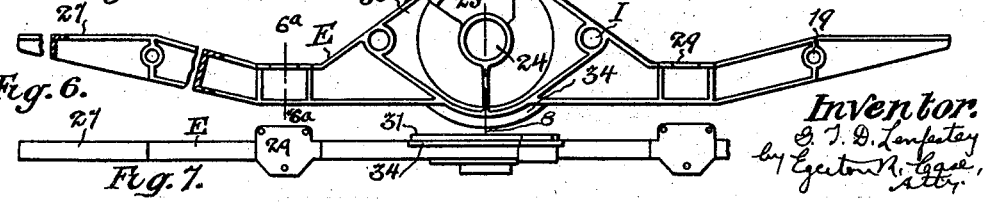
Fig. 6ᵃ. Fig. 5.
Fig. 6.
Fig. 7.
Inventor.
G. T. D. Lenfestey
by Egerton R. Case,
Atty.

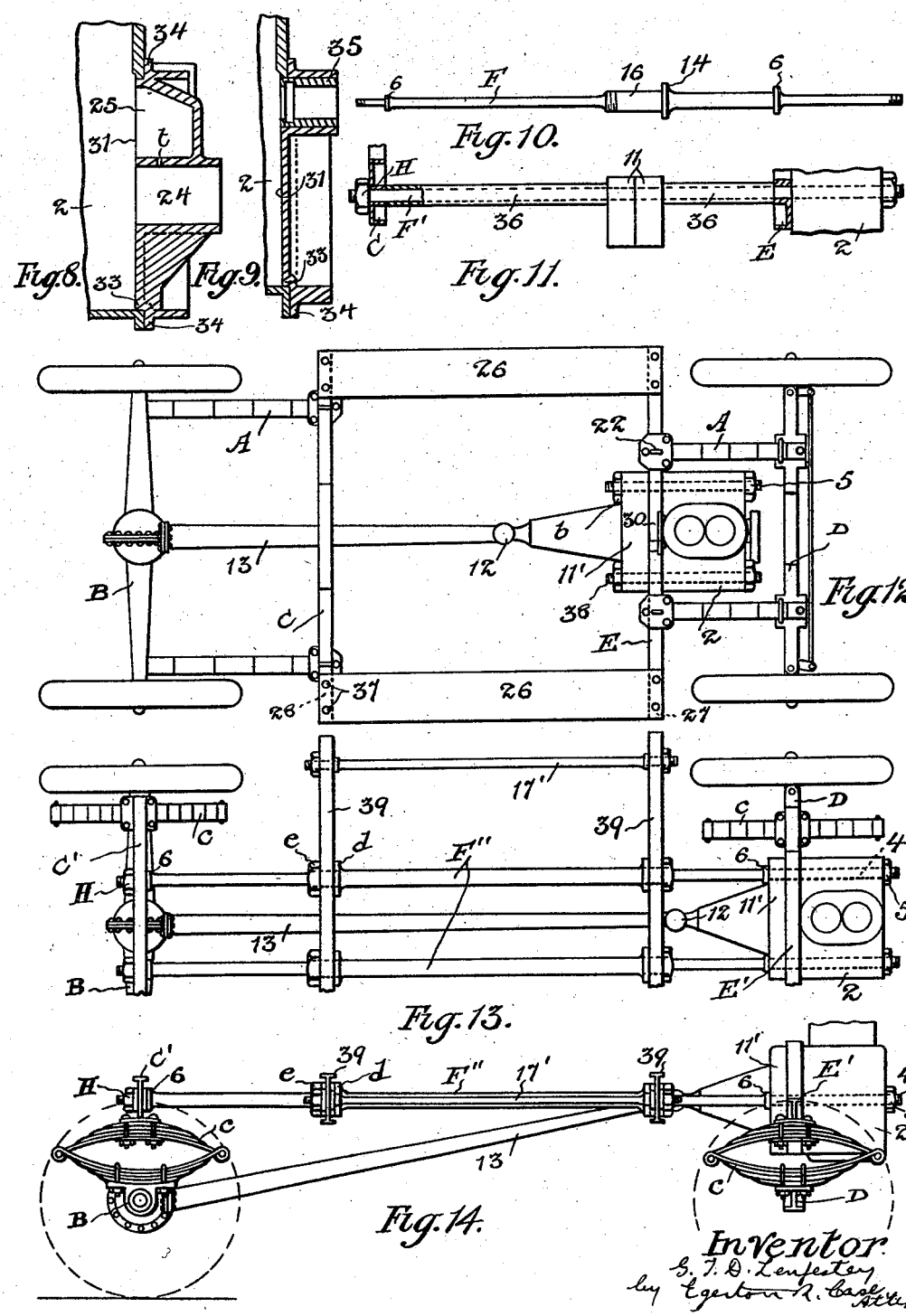

UNITED STATES PATENT OFFICE.

GERALD TOSTEVIN DIXON LENFESTEY, OF TORONTO, ONTARIO, CANADA, ASSIGNOR OF ONE-THIRD TO EGERTON RYERSON CASE, OF TORONTO, ONTARIO, CANADA.

DEMOUNTABLE MOTOR-VEHICLE FRAME.

1,313,429.     Specification of Letters Patent.     Patented Aug. 19, 1919.

Application filed June 22, 1917. Serial No. 176,350.

*To all whom it may concern:*

Be it known that I, GERALD TOSTEVIN DIXON LENFESTEY, of the city of Toronto, county of York, Province of Ontario, Canada, a subject of the King of Great Britain, have invented a certain new and useful Demountable Motor-Vehicle Frame, of which the following is a specification.

My invention relates to motor-vehicle frames, and the principal objects of my invention are: (1) the production of a longitudinally demountable motor-vehicle frame, for all classes of motor vehicles, so simple in construction that it can be shipped in parts and readily assembled at point of use without skilled labor and by means of which the wheel-base of the car can be increased or decreased as desired; (2) to provide a readily-demountable power-plant carried by a frame in a particular location and in a preferred manner, so that in certain forms, the longitudinal members of the frame support but a minor portion of the weight thereof; (3) to firmly support the side steps so that they can be made of lighter material than now used, and yet insure safety in use thereof, and increased life; (4) to support the body only at four points in certain forms thus enabling the same to be readily placed and removed; (5) to preferably place the center of the crank-shaft in alinement with the centers of the axles thereby enabling me to support the drive-shaft substantially in a horizontal plane and so reduce wear on the universal joint thereof; (6) to mount the gear-box in a particular way so that it may readily be opened up without the necessity of having to disconnect the motor; (7) to provide a motor-vehicle frame preferably demountable, the longitudinal members of which do not functionate the same, as the longitudinal members in standard frames, in that they are not intended to directly carry any of the weight of the freight nor of the body, which weight is directly carried by the transverse members of the frame, and (8) to provide a preferred type of locking means for the preferred type of reach so that there will be no leverage to cause a loosening of the same coupling the transverse and longitudinal members.

The construction of my preferred form of invention, and modifications thereof, will be hereinafter particularly set forth, and what I claim as new will be pointed out in the claims forming part of this specification.

Figure 17:
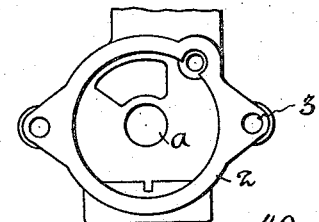
Figure 16:
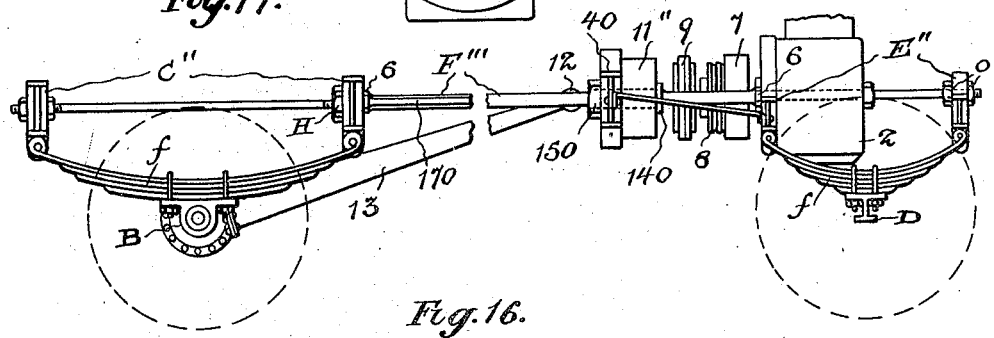

Figure 1 is a plan view of my preferred form of motor-vehicle frame, showing the preferred form of power-plant and type of springs combined therewith. Fig. 2 is a side elevation thereof. Fig. 3 is a front elevation of the rear bolster or cross beam. Fig. 3ª is a cross section on the line 3ª—3ª, Fig. 3. Fig. 4 is a plan view of the said rear bolster or cross-beam. Fig. 5 is a front elevation of the front bolster or cross-beam, and Fig. 6 is a rear elevation thereof. Fig. 6ª is a cross section on the line 6ª—6ª, Fig. 6. Fig. 7 is a plan view of the major portion of said front bolster or cross-beam. Fig. 8 is a vertical section on the line 8—8, Fig. 6, showing portion of the crank-case. Fig. 9 is a vertical section on the line 9—9, Fig. 5, showing portion of the crank-case. Fig. 10 is a plan view of the preferred form of reach. Fig. 11 is a side view of a modified form of reach, certain supporting parts being shown in section. Fig. 12 is a plan view of a modified form of my preferred form of frame in which the steps perform their usual function, as well as the function of a reach. This view also shows a modified way of supporting the power-plant. Fig. 13 is a plan view of the major portion of another modified form of my frame with power-plant carried thereby, and Fig. 14 is a side elevation thereof. These last-mentioned figures show the employment of double-elliptic springs, which are particularly useful for motor lorries. Fig. 15 is a plan view of a still further modified form of my frame with power-plant carried thereby, and Fig. 16 is a side elevation thereof. These last-mentioned figures show the employment of semi-elliptic springs. Fig. 17 is an elevation of the preferred form of construction of the rear end of the crank-case.

In the drawings, like characters of reference refer to the same parts.

As will be apparent to one skilled in this art after he is thoroughly seized of the construction of my invention in its various embodiments, cars for all purposes can be manufactured at much less cost than now, because very few surfaces have to be machined, and there are very few nuts and bolts and other coupling parts used.

The car, in its various modifications, can be shipped demounted, as well as the power-plant, and the various parts can be readily assembled to permit the mounting of the car at point of use. This demountable idea will not only effect a very large saving in freight, but it will also save storage room in a garage or motor-agency building.

It will be of course understood that I may permanently secure the various parts of the frame together and secure the advantage of cheapness of manufacture, and flexibility: but to do so, I would lose the benefits arising from the demountable feature. But it must be distinctly understood that though I have particularly designed my invention in its various embodiments to utilize the demountable idea, I do not desire to be confined to the demountable feature in the construing of my specification and claims.

Although I describe the power-plant as including an air-cooled engine, still it will be understood that in the broad conception of my invention, I do not confine myself to any particular type of power-plant.

Since the body in certain forms will be supported only at four points, it requires only the removal of four bolts to detach the body, and it requires only the removal of two nuts to remove the preferred form of motor or engine from the frame.

In designing my motor-vehicle frame, I have not only kept in view the demountable idea, but I have also endeavored to embody lightness, strength, stiffness and yet allow for a reasonable amount of flexibility. In all respects, the frame is designed to resist the destructive effect of long-continued strains of motor-vibration.

With my preferred form of frame, I make use of the cantaliver springs A. The rear ends of the rear springs are suitably coupled to the housing B preferably used to inclose the rear axle (not shown), and the front ends thereof are suitably coupled to the rear bolster or cross-beam C. The front axle D suitably carries the front ends of the front springs A, and the rear ends of these springs are suitably carried by the front bolster or cross-beam E. The said bolsters or cross-beams are coupled together by any suitable type of reach; these elements constitute the frame. I prefer to use a double reach in the form of a pair of rods F. The rear ends of these rods are suitably carried by the rear bolster or cross-beam C. I preferably pass them through the holes G formed in said bolster, and secure them therein by any suitable fastening means such as nuts H, threaded thereon. The front ends of the said rods are suitably carried by said front bolster E. My preferred construction for this purpose consists in passing the front ends of the said rods through holes I formed in said bolster. I preferably form the back of the crank-case integrally with the front bolster or cross-beam E. In Fig. 5, I show the front face of the said bolster, which is constructed to perform the function of a rear closure for the crank-case 2. The rear face of the crank case is shown in elevation in Fig. 17, and it will be observed that a hole 3 is formed in each side of said crank-case, and it is through these holes that the front portions 4 of the rods F pass. So soon as the crank-case and its supported parts, are placed on the front portions 4 of the said rods, nuts 5 or their equivalents are secured on the forward ends of said front portions thus jamming the crank-case against the front bolster or cross-beam E, and holding it tightly in this position. Any suitable means such as collars 6, are provided on the rods F to permit the parts described to be firmly secured to the said bolsters or cross-beams; thus drawing the various parts of the frame together. 7 is the fly-wheel; 8 any suitable type of clutch, and 9 any suitable type of universal coupling. The tail shaft 10 projects from the gear-box 11. 12 is any suitable type of universal coupling between the drive-shaft (not shown) preferably mounted within the torque-tube 13, and the gear-box 11. As shown in Figs. 1 and 2, the gear-box is preferably made in two parts, and the rods E pass therethrough. In other words, the said gear box is suspended from the double reach. By any suitable means such as a collar 14, formed on each of the said rods F, and nuts 15 or equivalents carried by the enlarged portions 16 of said rods F, the two portions of the said gear-box are firmly clamped together.

The engine or motor may be demounted in several ways: one way to do this is to disconnect the coupling 9; withdraw the clutch 8 longitudinally from the fly-wheel 7, and remove same. Then remove the nut (not shown) within the fly-wheel 7 on the end of the crank-shaft (not shown), and then remove the fly-wheel. By removing the nuts 5 from the ends 4 of the reaches F, the engine may be completely removed. In order to get at the interior of gear-box 11, when the body of the car (not shown) has been removed, it is only necessary to disconnect the universal coupling 12 and unscrew the nuts 15.

The outer ends of the bolsters or cross-beams C and E are preferably coupled together by the tie-rods 17, to stiffen the frame. These tie-rods pass through the holes 18 and 19 (see Figs. 3 and 5) formed in the said bolsters, and nuts 20 or equivalent means are carried on their outer threaded ends to effect coupling. The said tie-rods are provided with shoulders 21 which are drawn tightly against said bolsters.

In the preferred form of invention, where the rods F pass through the gear-box 11, they are enlarged. In demounting the frame, the various nuts described will be removed to permit the uncoupling of the rods and bolsters or cross-beams. The said rods F can then be drawn from the gear-box if desired.

Any of the well-known means is used to couple the springs A to their supports, and these couplings are readily removed to dismount the springs.

The fly-wheel 7 is preferably placed at one side of the front bolster or cross-beam E, and the engine is placed at the other side. This construction enables me to proportion these parts so that the weight of either one substantially balances the other.

The rear bolster or cross-beam C, in its preferred form, will be preferably arched, as shown at 211, Fig. 3, so as to allow me to provide a low frame, and at the same time allow for movement of the torque-tube 13, and the parts carried thereby.

22 are lugs carried by the bolsters or cross-beams C and E, and to these lugs will be coupled the body (not shown). The dotted line 23, Fig. 2, represents approximately the height of the floor of the body.

Upon referring to Fig. 2, it will be observed that the line X substantially passes through the axes of the front and rear wheels, and although the crank-shaft is not shown, it must be understood that this line also passes through the center of the crank-shaft bearings a and 24 formed respectively in the crank-case 2 and the front bolster E. The advantage derived from the preferred location of parts described is that I am enabled to keep the drive-shaft (not shown), mounted within the torque-tube 13, in substantially a horizontal position so as to reduce wear on the universal-coupling 12, or its equivalent.

It will be observed that I form a bearing 24 in the front bolster or cross-beam E to support one end of the crank-shaft (not shown). The other end of the crank-shaft of course has suitable bearing in the opposite end of the crank-case 2, as shown at a, Fig. 17.

Not only does the front bolster or cross-beam E perform the function of a support for the inner ends of the front springs A; the front ends of the tie-rods 17; the front portions of the rods F, and a rear closure for the crank-case 2, but may also perform the function of a lubricating member. To perform this function, the said bolster is provided with a lubricating chamber 25 formed integrally therewith.

Formed in the wall of the bearing 24, and leading from the lubricating chamber 25 is the oil-duct t which permits of the oiling of said bearing.

The said front bolster also performs the function of a support for the forward ends of the steps 26. A sufficient portion of each end of the said bolster E is provided with a flat face, which forms a seat as shown at 27, and it is upon these seats that the forward ends of these steps rest and to which they are suitably secured. The rear ends of the said steps rest upon the top face or seat 28, at each end of the rear bolsters or cross-beam C, as shown in Fig. 1, and they are suitably secured in place. I do not show any fastening means for the steps, because ordinary bolts and nuts will preferably be used. The construction just described enables me to firmly support the said steps. I may use lighter material than is usually used to manufacture the steps, because of the manner in which they are supported. It will be evident that there will be no possibility of the supports for these steps sagging.

Since the bolsters or cross-beams are very important members in my frame, I shall construct them to secure the maximum strength with the minimum weight. My preferred construction for these bolsters is to form the outer ends of the same, which support the steps, in the form of angle-iron, and to form the rest of the bolsters in the form of channel-iron: suitable webbing being employed to strengthen the bolsters, particularly where the rods before described pass therethrough. The seats 29 for the inner ends of the front springs A are preferably below the seats 27. This construction enables me to keep the floor of the body (not shown) quite low.

The statement respecting the preferred construction of the front bolster or cross-beam E, in cross section, is substantially true, except in respect of the middle portion of said bolster or cross-beam which I construct so that it will form the rear plate or closure-member 30 for the crank-case 2. The preferred construction of this portion of the bolster is particularly set forth in Figs. 5 and 6. This back-plate or closure-member 30 of the crank-case, is preferably provided with a breast 31, which projects beyond the surface 32, thus forming an annular shoulder 33 which is received by the crank-case 2, as shown very clearly in Fig. 8. This shoulder 33 enables me to aline the crank-bearings a and 24 as well as the crank-case. As before described, the crank-case is held up tightly against the back-plate or closure-member 30. Said back-plate or closure-member is also provided with an annular flange 34, which is faced off, and rests in contact with the crank-case, as shown in Fig. 8.

It is pointed out that, in the preferred form of construction, as the shoulder 33 of the front bolster E rests within the crank-case 2, (see Figs. 8 and 9), this shoulder provides a flange or ledge which affords vertical support for the engine. This construction or its equivalent supports substantially the entire weight of the engine from said bolster, and the portions 4 of the rods F, together with the nuts 5, merely bind or clamp the crank-case 2 against the said bolster.

By one skilled in this art, it will be understood that in order to prevent the sagging of the floor of the car or body supported by the bolsters, the same should be made sufficiently stiff to bridge the distance between the said bolsters, though in the form illustrated in Fig. 12, the body may be partly carried by the steps 26. It will therefore be understood that while I prefer to relieve the longitudinal members of any of the weight of the freight carried by the car, still it is within the terms of my claims to partly support said weight by said longitudinal members.

It is now the practice to provide many motor-vehicle bodies with very heavy side sills, or longitudinal members, as the body or platform is carried thereon midway the spring-carried transverse members, which also support same. By my invention I avoid the use of these heavy sills, and so effect a considerable saving in weight and expense.

It will be observed that the running-gear with which my frame is incorporated, can be separated into two parts; a front and a rear part; these parts respectively comprise a front axle and its springs and their associated transverse frame member or bolster, and the rear axle and its springs and associated transverse frame-member or bolster. The fact just set forth permits the running-gear to be longitudinally separated without uncoupling the component elements of the front and rear parts thereof: this appears to be a principle new to the art.

One great advantage derived from the separation of the running-gear as described, is that the same can be lengthened or shortened to change the wheel-base. To effect this change, the longitudinal members will have to be lengthened or shortened as required. This can be done in various ways, but the preferred method will be to use an entirely separate set of said longitudinal members. The reach shown in Fig. 10 is longer, for example than the reaches shown in Fig. 1. A pair of these longer reaches can readily be substituted for the shorter ones. Where the longitudinal members are directly associated with the power-plant in part or in whole, it will be observed that the power-plant must be demounted during this operation.

In lengthening or shortening the form of running-gear illustrated in Fig. 12, it is only necessary to change the length of the longitudinal members or steps 26, and make a corresponding change in the length of the drive-shaft (not shown).

In Fig. 8, the lubricating chamber 25 is very clearly shown, and it will be understood that the oil received thereby will be used to oil the rear end of the crank-shaft 24 and so enable me to dispense with a complicated system of oiling. It will, of course, be understood that in the broad idea of forming the back-plate or closure-member integrally with the bolster or cross-beam E, I do not confine myself necessarily to using the lubrication chamber 25, nor to any particular construction of this back-plate.

Although I show the bearings 35 for the cam-shaft (not shown), it will be understood that the said bearing is not essential.

In Fig. 11, I show a modified form of reach. This comprises a rod F' which is held in the front and rear bolsters C and E, and supports the crank-case 2 and connecting parts, as well as the gear-box 11. Mounted on said rod, intermediate the said bolsters and the said crank-case, are spacing sleeves 36. These sleeves enable me to dispense with the collars 6 and nuts 15, if desired.

In the modified form of my invention shown in Fig. 12, I dispense with the double reach composed of the rods F, and in place thereof use the steps 26 to perform the function of said double reach, as well as of the rods 17. The said steps will be secured by bolts 37 or equivalent fastening means, to the bolsters C and E, and will be made stout enough to efficiently perform the functions desired. The crank-case 2 and supporting parts, as well as the bolster E, are constructed substantially as described, and in place of positioning the gear-box 11' as shown in Fig. 1, it is positioned against the inner side of the bolster E, which may form a closure-member for one end thereof. Tie-bolts 38 pass through said crank-case and gear-box and bolster E, and by means of the nuts 5 and b, the parts described are pulled up against the said bolster and held there.

It will be understood that in this modified form, the demountable idea is carried out.

In the form of my invention illustrated in Figs. 13 and 14, I make use of double elliptic-springs c, and in order to support these springs properly, the bolster E' must be placed substantially above the front axle D, and the bolster or cross-beam C' substantially above the rear axle (not shown). The double reach composed of the rods F'' is used after the manner before described, and the crank-case 2 and gear-box 11' are supported by the forward portions 4', of said rods. In utilizing the double elliptic-spring c, I cannot make use of the bolsters as a support for the steps, and therefore, I mount on said rods F″, cross-beams 39, and brace the outer ends of the same by rods 17′.

In this form of my invention, I clamp the rods F″ between the collars d and the nuts e threaded on the ends of the central portions of said rods, which are enlarged. The nuts e, are large enough to be passed over the collars 6. This form of my invention also includes the demountable idea.

In Figs. 15 and 16, I show my idea incorporated by a frame in which the semi-elliptic springs f are used. In order to properly support these springs, I must provide double front-and-rear bolsters E″ and C″. The said springs are suitably clamped to the front axle D, and housing B. The double reach or rods F‴ are associated with the power plant as before described and pass through both sets of front and rear bolsters. The forward rear bolster C″ coöperates with a cross-beam 40 to support the steps (not shown) which may or may not be used in this form. In these views, the crank-case 11″ is shown as clamped against one side of the cross-beam 40, (which may form a closure for one end thereof) by the nuts 150 and collars 140. The rear ends of the rods F‴ are clamped by the nuts 151, threaded thereon, to the rearmost bolster C″.

The forward bolster C″ and cross beam 40 are braced by the tie-rods 170, removably mounted in place; and the outer ends of the cross-beam 40 are preferably braced to the inner cross-beam or bolster E″ as shown at 171.

The forward ends of the rods F‴ are mounted in the front bolster E″, and are suitably clamped thereto by the nuts o threaded thereon.

I have found that the nuts and flanges, or their equivalents, in performance of function, used to couple the various reaches to the transverse members, and certain parts of the power-plant together and to the frame, are most satisfactory, because while I can firmly secure the various elements of my frame and power-plant together, without danger of appreciably loosening thereof under service conditions, I am enabled to easily demount these parts. It will be observed that the fastening means for said elements exerts power parallel to the longitudinal axes of said longitudinal members so that no leverage can be brought into play to effect loosening. This is a very important feature in a readily demountable serviceable motor-vehicle frame.

By one skilled in this art, it will be seen, particularly upon reference to Fig. 2, that the center of the crank-shaft (not shown) is substantially on a level with the centers of the front and rear axles, and this fact presents the advantage before set forth of keeping the drive-shaft substantially in a parallel position, and so relieve the universal coupling 12 of excessive wear.

The longitudinal members in my frame, apart from the fact that they support, in some cases, part of the power-plant, are preferably not intended to directly carry any of the weight of the freight carried by the car nor the weight of the car-body, as this weight will be supported directly by the bolsters. It will be understood that in the forms illustrated in Figs. 14 and 16, the floor of the car or truck (not shown) will be carried by the front and rear bolsters E′ and C′, and the double bolsters C″ and E″, without resting upon the cross-beams 39 and 40. The chief functions performed by the said longitudinal members are those of holding the various bolsters and their springs in coöperative relationship; directly supporting certain parts of the power-plant, and certain parts thereof tying other parts of the power-plant, in some forms, against a front bolster.

Without further elaboration, it will be understood how the various parts of the frame can be readily taken apart and assembled without the employment of skilled labor for that purpose.

In this specification and claims, I have used the phrase "demountable motor-vehicle frame" to mean a structure that is held together by fastening or clamping means which can be readily removed without destruction. The frame of the standard automobile is now permanently riveted or brazed, and although such brazing or rivets can be cut away and the frame taken apart, nevertheless such frames are not "demountable" in the true meaning of the term.

It will be understood that although I preferably combine the power-generating and speed-control elements of the power-plant (which may be of any suitable construction), with a demountable frame, I do not confine myself to combining the same with a demountable frame, as it will be readily understood the said elements can be readily disconnected and parts demounted without demounting the frame.

While I have described what I consider to be the best embodiments of my invention, I desire it to be understood that the principle of the invention can be embodied in other different forms, and I desire not to be limited beyond the requirements of the prior art, and the terms of my claims.

Claims:

1. A motor vehicle frame comprising front and rear transverse load-supporting members adapted for connection respectively to the springs of the front and rear axles of a motor-vehicle, and a longitudinal reach member disengageably coupled to said transverse members so that the frame may be partially and wholly demounted lengthwise.

2. A demountable motor vehicle frame comprising front and rear transverse load-supporting members adapted for connection respectively to the springs of the front and rear axles of a motor-vehicle, a longitudinal reach member extending therebetween, and means disengageably coupling said transverse members to said longitudinal member so as to permit the frame to be partially and wholly demounted lengthwise.

3. A motor vehicle frame comprising parallel front and rear transverse members, parallel longitudinal reach members extending therebetween, and means disengageably coupling said transverse members to said longitudinal members so as to permit the frame to be partially and wholly demounted lengthwise.

4. A motor vehicle frame comprising front and rear transverse members, a longitudinal reach member extending therebetween, and means disengageably coupling said transverse members to said longitudinal member located to effect locking action longitudinally of said longitudinal member so as to permit the frame to be partially and wholly demounted lengthwise.

5. A motor vehicle frame comprising spaced front and rear transverse members, coupling means including a longitudinal reach member directly detachably associated with said transverse members and extending longitudinally of said frame between said transverse members, and means to effect locking action between said coupling means and said transverse members longitudinally of said coupling means.

6. A demountable motor-vehicle frame comprising transverse members; longitudinal means, and means whereby said longitudinal means and said transverse members are disengageably directly associated with said transverse members and coupled together in spaced relationship and in such a manner that either transverse member may be independently uncoupled from said longitudinal means by being moved lengthwise of said frame.

7. A demountable motor vehicle frame, comprising, in combination, front and rear transverse members, a longitudinal reach member extending therebetween, and means rigidly and detachably coupling said transverse members to said longitudinal member so that total and partial uncoupling of said transverse and longitudinal members may be had lengthwise of the frame.

8. In combination, a demountable motor-vehicle frame comprising transverse and longitudinal members; means firmly coupling said transverse and longitudinal members demountably together, and in such a manner that total and partial uncoupling of said transverse and longitudinal members may be had lengthwise of the frame; a power-plant, and means whereby said power-plant is demountably carried by said frame so that in order to partially or wholly remove the same, the power-generating and speed-control elements thereof must be uncoupled.

9. A demountable motor-vehicle frame comprising front and rear transverse members spaced apart longitudinally of said frame; interchangeable coupling members therefor extending longitudinally of the frame and disengageably coupling said transverse members together so that coupling members of different lengths may be used to vary the length of the frame, and means located to effect locking action between said coupling members and said transverse members longitudinally of said coupling members.

10. A running gear for motor vehicles comprising front and rear axles, each having associated springs, a demountable frame comprising front and rear transverse members supported by said springs, and means including a longitudinal reach member demountably rigidly coupled to said spring-supported transverse members so that said spring-supported transverse members may be independently and together uncoupled from said reach member longitudinally of said frame.

11. A running gear for motor vehicles comprising front and rear axles, each having associated springs, and a demountable frame supported by said springs and coupling the same and their associated axles together, said frame including a detachable longitudinal reach member so that the running gear may be lengthened and shortened to vary the length of the wheel base.

12. A demountable running-gear for motor vehicles comprising front and rear axles, each having associated springs, front and rear transverse direct-load-carrying members coupled to their associated springs, and indirect-load-carrying longitudinal members demountably coupled to said transverse members.

13. In combination, a demountable running gear for motor vehicles comprising front and rear axles, each having associated springs, front and rear transverse direct-load-carrying members coupled to their associated springs, indirect-load-carrying longitudinal members demountably coupled to said transverse members, and a power-plant demountably carried by said longitudinal members.

14. In combination, a demountable running-gear for motor-vehicles comprising front and rear axles; associated springs; transverse direct-load-carrying members coupled to their associated springs; indirect-load-carrying longitudinal members demountably coupling said transverse members together, and a power-plant demountably carried thereby in such a manner that the power-generating and speed-control elements thereof must be uncoupled before demounting.

15. In combination, a demountable running-gear for motor-vehicles, comprising front and rear axles; associated springs; transverse direct-load-carrying members coupled to their associated springs; indirect-load-carrying longitudinal members demountably coupling said transverse members together, and a power-plant demountably carried by the front end of said gear in such a manner that in order to demount the same, the power-generating and speed-control elements thereof must be uncoupled.

16. In combination, a demountable motor-vehicle frame comprising front and rear transverse members spaced apart longitudinally of said frame; a double reach extending longitudinally of said frame coupling said transverse members together, the front ends of said reaches projecting beyond one of said transverse members; collars carried by each of the said reaches and designed to abut against the inner sides of said transverse members; a crank-case mounted on the projecting ends of said reaches, and removable means carried by the ends of the said reaches and exerting pressure longitudinally thereof and whereby the said reaches and transverse members are firmly clamped together.

17. A motor-vehicle frame comprising front and rear transverse members spaced apart longitudinally of said frame; a double reach extending longitudinally of said frame and coupling said transverse members together, and a power-plant element demountably carried by said double reach between said transverse members and performing the function of a brace therefor to help maintain the same in parallel relationship.

18. A motor-vehicle frame comprising transverse direct-load-carrying members spaced apart longitudinally of the frame, and a reach coupling said members together and occupying a plane below the top of said transverse members.

19. In a motor-vehicle frame, the combination of a crank-case; a transverse member positioned substantially at right angles thereto; a gear-box; means on which said gear-box is mounted, the said means being supported in said transverse member and extending to be coupled to said crank-case, and means carried by said supported means whereby said crank-case and gear box are individually demountably held in relative position in respect of said member.

20. In a demountable motor-vehicle frame, the combination of a crank-case provided with horizontally alined holes therethrough one at each side thereof; a transverse member positioned substantially at right angles thereto; a gear-box made of two sections, each provided at both sides with alined holes; means on which said gear-box is mounted, said means being supported in said transverse member and extending through the holes formed in said crank-case; means carried by said supporting-means whereby the sections of said gear-box are removably held together, and disengageably means carried by the front ends of said supported means whereby said crank-case is clamped against said transverse member.

21. In a demountable motor-vehicle frame, the combination of a crank-case provided with horizontally-alined holes therethrough, one at each side thereof, and further provided with an opening for the crank-shaft; a bolster positioned substantially at right angles to said crank-case and provided with a bearing therethrough in alinement with the opening in said crank-case; means whereby said crank-case is demountably supported by said bolster so that this bolster will carry the weight thereof; a pair of rods held in said bolster horizontally in alinement and extending beyond each side thereof, the front portions of said rods extending through their associated holes formed in said crank-case and projecting beyond the front side thereof; a gear-box made of two sections, and having alined holes at each side thereof whereby the said gear-box is mounted on said rods; removable means carried by the ends of said rods projecting beyond said crank-case to clamp the case against said bolster, and means whereby the sections of said gear-box are removably clamped together.

22. In combination, a demountable motor-vehicle frame comprising transverse members, and longitudinal members demountably coupling the same together; power-generating elements; speed-control elements, each group positioned on opposite sides of one of said transverse members, and means whereby the same are demountably held in place.

23. In a motor-vehicle frame, the combination of power-generating elements; a transverse member of said frame on one side of which said power-generating elements are positioned; speed-control elements positioned on the other side of said transverse member; and means held in said member and extending beyond both sides thereof and whereby 24. In a demountable motor-vehicle frame, the combination of a crank-case provided with horizontally-alined holes therethrough one at each side thereof, and further provided with an opening for the crank-shaft; a bolster positioned substantially at right angles to said crank-case and provided with a bearing therethrough in alinement with the opening in said crank-case; means whereby said crank-case is demountably supported by said bolster so that this bolster will carry the weight thereof; a pair of rods held in said bolster horizontally in alinement and extending through their associated holes formed in said crank-case and projecting beyond the front side thereof, and removable means carried by the outer ends of said rods whereby said crank-case is held tightly against said transverse member.

25. In a demountable motor-vehicle frame, the combination of a bolster construction to form a bearing-provided closure-member for a case of a power-plant, and provided with an annular flange concentrically surrounding said bearing; the said case, the same having an open end, and a bearing formed in the closed end thereof, and further provided with a pair of alined holes one at each side thereof and extending horizontally therethrough; the said crank-case designed to be fitted against said bolster so as to be supported upon said flange in order that the weight of the case may be carried by said bolster; a pair of rods held in said bolster horizontally in alinement and extending through their associated holes formed in said crank-case and projecting beyond the front side thereof, and removable means carried by the outer ends of said rods whereby said crank-case is held tightly against said transverse member.

26. A demountable motor-vehicle frame comprising the combination of front and rear direct-load-carrying bolsters; steps supported by the outer ends of said bolsters, and an indirect-load-carrying reach demountably coupling said bolsters together.

27. A demountable motor-vehicle frame comprising the combination of front and rear direct-load-carrying bolsters; steps supported by the outer ends of said bolsters, an indirect-load-carrying reach demountably coupling said bolsters together, and stay-rods for said bolsters at each side of said reach.

28. A demountable motor-vehicle frame comprising the combination of front and rear direct-load-carrying bolsters, and a double indirect-load-carrying reach demountably coupling the same together, the front ends of said double reach projecting beyond the said front bolster far enough to form supports.

29. In combination, a motor-vehicle frame comprising front and rear bolsters; a double reach demountably coupling said bolsters together, and a power-plant demountably held in position by said reach as to be readily removable therefrom.

30. In combination, a motor-vehicle frame comprising front and rear bolsters; a double reach demountably coupling said bolsters together, and projecting beyond said front bolster; a crank-case mounted on the forward ends of said reach, and removable means whereby said crank-case is clamped in position.

31. In combination, a motor-vehicle frame comprising front and rear bolsters; a double reach demountably coupling said bolsters together, and projecting beyond said front bolster; a crank-case mounted on the forward ends of said reach; removable means whereby said crank-case is clamped in position; a gear-box constructed in two parts mounted on said double reach, and means whereby said parts are removably clamped together, 32. In combination, a motor-vehicle frame comprising a rear bolster; a front bolster constructed to form a bearing-provided closure member for a crank-case; said crank-case, the same having an open end, and means whereby said bolsters are coupled together and said crank-case clamped against said front bolster, for the purpose specified.

33. In combination, a motor-vehicle frame comprising a rear bolster; a front bolster constructed to form a bearing-provided closure member for a crank-case; said crank-case, the same having an open end, and a double reach demountably coupling said bolsters together and having its forward ends extending through and beyond said front bolster, and through said crank-case, and means whereby said crank-case is removably held on said front ends against said front bolster.

34. In a motor vehicle running gear, the combination of front and rear axles, a pair of springs supported by each of said axles, transverse front and rear members coupling each pair of said springs together, and a detachable longitudinal reach member coupling said spring-coupling means together.

35. In a motor-vehicle running-gear, the combination of front and rear axles; a pair of springs supported by each of said axles; means coupling each of said springs together transversely; a power-plant supported by said means in such a manner as to be readily removable without demounting the running-gear, and demountable means coupling said spring-coupling means together.

36. In a motor-vehicle running-gear, the combination of front and rear axles; the wheels mounted thereon with their axes of rotation in substantially the same horizontal plane; front and rear bolsters; the said front bolster having a bearing; springs functionally interposed between said bolsters and their respective axles; demountable means coupling said bolsters together; a bearing-provided crank-case removably clamped against said front bolster so that the said bearings will be in alinement and substantially in the same plane as the axes of said wheels.

37. In a motor-vehicle frame, the combination of a bolster constructed to form a bearing-provided closure-member for a case of a power-plant; the said case, the same having an open end and a bearing formed in the closed end thereof, and means whereby said case is demountably clamped against said bolster with the said bearings in alinement.

38. In a motor-vehicle frame, the combination of a bolster constructed to form a bearing-provided closure-member for a case of a power-plant; the said case, the same having an open end and a bearing formed in the closed end thereof, and means carried by said bolster whereby said case is demountably clamped against said bolster with the said bearings in alinement.

39. As a new article of manufacture, a bolster, the sides of which lie within parallel vertical planes throughout their length, and made of angle construction at the outer portions thereof so that the horizontal flange will form a plane seat on the upper side thereof at each end of the bolster; the intermediate portion of the bolster made of channel construction and provided with a plurality of holes located as desired.

40. As a new article of manufacture, a centrally-arched rear bolster, the sides of which lie within parallel vertical planes throughout their length, and made of angle construction at the outer portions thereof so that the horizontal flange will form a plane seat on the upper side thereof at each end of the bolster; the intermediate portion of the bolster made of channel construction and provided with a plurality of holes located as desired.

41. As a new article of manufacture, a bolster comprising a transverse load-carrying member, and a bearing provided vertically-disposed plate integrally formed therewith to perform the function of a closure member, as set forth.

42. As a new article of manufacture, a bolster comprising a transverse load-carrying hole-provided member, and a bearing-provided vertically-disposed plate integrally formed therewith to perform the function of a closure member, and designed to project beyond one side of said transverse member so as to form an annular flange which surrounds said bearing; the said holes in said transverse member being positioned one beyond each side of said plate.

43. As a new article of manufacture, a bolster with which is centrally integrally formed at one side thereof, a bearing-provided closure member formed with a projecting breast to form an annular flange surrounding said bearing; the outer ends of said bolster constructed to form seats; the bolster being further provided with holes to permit fastening means to pass therethrough.

44. As a new article of manufacture, a bolster with which is centrally integrally formed at one side thereof, a bearing-provided closure-member; a pair of spring seats integrally formed with said bolster and one at each side of said closure member; the outer ends of said bolster being formed to provide seats which occupy a plane above said spring seats; the said bolster further provided with holes to permit fastening means to pass therethrough.

45. As a new article of manufacture, a bolster with which is centrally integrally formed at one side thereof, a bearing-provided closure-member from which opens rearwardly a lubricating chamber for said bearing; a pair of spring seats integrally formed with said bolster and one at each side of said closure member; the outer ends of said bolster further provided with holes to permit fastening means to pass therethrough.

46. In a motor-vehicle frame, the combination of a bolster with which is integrally formed a bearing-provided closure member for a crank-case; the said crank-case, and means whereby the same is removably clamped against the said closure-member.

47. In a motor-vehicle frame, the combination of a hole-provided bolster with which is integrally formed a bearing-provided closure-member for a crank-case through which opens rearwardly an oiling chamber for said bearing; the said crank-case, the same provided with holes, and means passing through the holes formed in said bolster and said crank-case and whereby the same are removably clamped together.

48. In combination, a demountable motor-vehicle frame, composed of front and rear bolsters; a double reach composed of two rods demountably coupling the said bolsters together; a gear-box made of two portions provided at each side with a hole through which the rods of said double bolster pass, and means carried by said rods whereby the two portions of said gear-box are demountably held together.

49. As a new article of manufacture, a reach-member threaded at each end and integrally provided with collars spaced apart and of different diameters; part of the middle portion of said member being of greater diameter than the rest and having one end threaded, and a collar of greater diameter thereof at the other end.

50. A motor-vehicle frame comprising the combination of front and rear transverse members forming the end members of the frame, and means coupling the same together and projecting beyond the front end member far enough to form a support for the purpose specified.

51. A motor-vehicle frame comprising the combination of front and rear transverse members forming the end members of the frame, and a double reach coupling the same together, the front ends of said double reach projecting beyond said front member far enough to form supports for the purpose specified.

52. A motor-vehicle frame that may be partially and wholly demounted lengthwise, comprising the combination of front and rear transverse members forming the end members of the frame, and means demountably coupling the same together and projecting beyond the front end member far enough to form a support for the purpose specified.

53. A motor-vehicle frame that may be partially and wholly demounted lengthwise, comprising the combination of front and rear transverse members forming the end members of the frame, and a double reach coupling the same together and projecting beyond the front end member far enough to form a support for the purpose specified.

54. A demountable motor-vehicle frame comprising front and rear transverse members forming the end members of the frame, and interchangeable means, whereby the length of the frame may be varied, coupling the same together and projecting beyond the front end member far enough to form a support for the purpose specified.

55. A motor vehicle frame comprising spaced transverse load-supporting members positioned to form the front and rear members of said frame adapted for connection respectively to the springs of the front and rear axles of a motor-vehicle, and functionally unitary means directly associated with and disengageably coupling said transverse members together so that said transverse members may be independently removed from said unitary means.

56. A demountable motor vehicle frame comprising front and rear transverse load-supporting members spaced apart longitudinally of said frame adapted for connection respectively to the springs of the front and rear axles of a motor-vehicle, and removable interchangeable coupling means positioned between said transverse members and directly disengageably associated therewith to couple said members together so as to permit coupling means of different lengths to be used to vary the length of the frame.

57. In a motor vehicle frame, removable spaced front and rear transverse load-supporting members adapted for connection respectively to the springs of the front and rear axles of a motor-vehicle, and a longitudinal reach member extending therebetween and detachably rigidly connected to each of the same.

Toronto, June 19th, 1917.

GERALD TOSTEVIN DIXON LENFESTEY.